United States Patent [19]

Matrick

[11] Patent Number: 5,169,438

[45] Date of Patent: Dec. 8, 1992

[54] AQUEOUS INK JET INKS CONTAINING CYCLOALIPHATIC DIOL PLUGGAGE INHIBITORS

[75] Inventor: Howard Matrick, Highlands, N.J.

[73] Assignee: E. I. Du Pont de Nemours and Company, Wilmington, Del.

[21] Appl. No.: 714,876

[22] Filed: Jun. 13, 1991

[51] Int. Cl.$^5$ ............................................. C09D 11/00
[52] U.S. Cl. ............................ 106/22 R; 106/20 D; 106/23 R; 106/401; 106/499; 526/190
[58] Field of Search ............... 106/20, 22, 23, 401, 106/499; 430/347, 138; 526/190

[56] References Cited

U.S. PATENT DOCUMENTS

| | | | |
|---|---|---|---|
| 4,119,398 | 10/1978 | Purser | 8/2.5 R |
| 4,508,880 | 4/1985 | Webster | 526/190 |
| 4,597,794 | 7/1986 | Ohta et al. | 106/20 |
| 4,657,590 | 4/1987 | Gamblin | 106/22 |

*Primary Examiner*—William R. Dixon, Jr.
*Assistant Examiner*—Margaret V. Einsmann

[57] ABSTRACT

An ink for ink jet printers which comprises an aqueous carrier medium, pigment dispersion or dye and a cosolvent which retards or inhibits pluggage failure. The latter is an cycloaliphatic diol having a total of at least 6 carbon atoms and having a solubility in water of at least 4.5 parts in 100 parts of water at 25° C.

The pigment dispersion consists of pigment particles and a dispersant, preferably a polymeric dispersant, having a hydrophilic segment and a segment that links to the pigment. These inks exhibit long decap times, are storage stable, have reliable performance and give images having good print quality.

40 Claims, No Drawings

AQUEOUS INK JET INKS CONTAINING CYCLOALIPHATIC DIOL PLUGGAGE INHIBITORS

FIELD OF THE INVENTION

This invention relates to aqueous inks for ink jet printers, and, more particularly, to aqueous, colored inks containing cycloaliphatic diol cosolvents which impart pluggage resistance to the inks.

BACKGROUND OF THE INVENTION

Ink jet printing is a non-impact method that in response to a digital signal produces droplets of ink that are deposited on a substrate such as paper or transparent film. Ink jet printers, especially thermal or bubble jet drop-on-demand printers have found broad application as output for personal computers in the office and the home.

A major concern with all ink jet printing devices is pluggage of nozzles during operation and between operations. A critical measured property for an ink jet ink is the "decap time" which is the length of time over which an ink remains fluid in a pen opening when exposed to air and therefore capable of firing a drop of ink at its intended target. "Decap" means the pen is uncovered or "decapped". The major cause of decap failure is due to evaporation of the aqueous carrier medium, i.e., either cosolvent or water. Initial evaporation generally causes an increase in viscosity which affects the ability of the nozzle to fire a drop since ink jet pens are designed to operate within specific viscosity ranges. Initial failure may be a displacement from the intended target position caused by deflection of the drop or creation of an altered trajectory. Continued evaporation may result in a solid component being precipitated or crystallized in the nozzle which in turn could result in an undesirable satellite spray occurring or a single line of print diverging into a double line. Finally, the nozzle may form a solid skin and totally fail by no longer ejecting ink.

The situation becomes more complex with pigmented inks because a change in solvent composition due to evaporation can cause pigment flocculation or aggregation. This will also lead to nozzle pluggage. In a multi-nozzle printer, certain nozzles are assigned to infrequently used characters and these are the most likely to undergo pluggage failure.

A further complicating factor is the use of heating devices to accelerate ink drying on the paper. This also accelerates solvent evaporation in the nozzle and makes pluggage more likely.

When the printer is lying idle, it is desired that an ink that has been exposed to air for several hours inadvertently or otherwise should print satisfactorily. If such a nozzle fails to print it is desirable that the nozzle become operational after firing several times into a "spittoon". The ability to recover in this manner is measured by fifth and thirty-second drop decap time test.

Various means of increasing decap time have been developed. As already mentioned above, one involves non-printing ejection, i.e., firing ink into a "spittoon" after a certain time interval of a nozzle not printing. This tends to slow the printing rate. Another decap cure is the use of forced air or vacuum suction to clear a plugged nozzle. These devices are often inefficient and add considerable expense to the cost of the printer.

Pluggage can be retarded by use of high boiling cosolvents. Use of high boiling water soluble liquids such as triethylene glycol and glycerol do not produce the desired improvement in decap time and also retard drying on paper as shown in Tables 2 and 4, Controls 5 and 6, in the Examples.

An important requirement for inks where the colorant is a pigment is for the pigment dispersion to remain stable throughout the life of the ink jet cartridge. Dye-based ink jet inks suffer from deficiencies in water fastness, smear fastness and lightfastness. Therefore pigments are a preferred alternative to dyes provided the pigment dispersions can be made stable to flocculation and settling. Some cosolvents that are good pluggage inhibitors cause destabilization of pigment dispersions and therefore cannot be used as pluggage inhibitors in pigmented inks. An example of this is 1,2,7,8-octanetetrol as evidenced in Table 3, Control 7.

Accordingly, a need exists for cosolvents which function as pluggage inhibitors without destabilizing pigment-based inks and excessively increasing drying time on paper. The pluggage inhibitors claimed in this invention have the ability to retard or inhibit print failure due to pluggage formation, demonstrate compatibility with aqueous pigment dispersions, and have acceptable drying rates. These pluggage inhibitors however, are also useful in dye-based inks.

SUMMARY OF THE INVENTION

The invention relates to an aqueous ink jet ink composition comprising:
(a) an aqueous carrier medium,
(b) a colorant selected from the group consisting of a pigment dispersion and a dye; and
(c) a cycloaliphatic diol, having a solubility in water of at least 4.5 parts in 100 parts of water at 25° C., and having the general formula:

$C_nH_{2n-2}(OH)_2$ wherein n is at least 6.
One subclass of cycloaliphatic diol has the general formula:

$C_nH_{2n-2}(CH_2OH)_2$ wherein n is at least 5.
The inks of this invention have superior decap performance, are extremely stable, are rapid drying, have low viscosity, exhibit excellent print quality, and provide excellent water and smear resistance after drying. They may be used with a variety of ink jet printers such as continuous, piezoelectric, drop-on-demand and thermal or bubble jet drop-on-demand, and are particularly adapted for use in thermal ink jet printers.

DETAILED DESCRIPTION OF THE INVENTION

The invention relates to an ink jet ink composition which is particularly suited for use in ink jet printers in general, and thermal ink jet printers in particular. The ink jet ink composition encompasses both pigment-based inks and dye-based inks. The pigmented inks comprise an aqueous carrier medium, a cycloaliphatic diol and a pigment dispersion which is an aqueous dispersion of pigment particles stabilized by dispersants, preferably polymeric dispersants, that are stable over long periods, both in storage and in the printer. The dye-based inks comprise an aqueous carrier medium, a dye and a cycloaliphatic diol pluggage inhibitor. The inks may be adapted to the requirements of a particular ink jet printer to provide a balance of light stability, smear resistance, viscosity, surface tension, high optical density, and pluggage or crust resistance.

The aqueous carrier may contain an organic water soluble compound other than the cycloaliphatic diol cosolvent as well as water.

CYCLOALIPHATIC DIOL COSOLVENT

The compounds of this invention fill a need for pigmented ink jet inks having good dispersion stability, improved decap times and good drying characteristics.

The cycloaliphatic diol has the following general formula:

$$C_nH_{2n-2}(OH)_2$$

wherein n is at least 6, preferably 6–12, more preferably 6–10, and wherein said compound has a solubility in water of at least 4.5 parts in 100 parts of water at 25° C.

One subclass of cycloaliphatic diol compounds have the general formula:

$$C_nH_{2n-2}(CH_2OH)_2$$

wherein n is at least 5, preferably 6–8.

The upper limit of n is determined by the water solubility of the compound, i.e., any compound with solubility of at least 4.5 parts in 100 parts of water at 25° C. is useful.

The 2 hydroxyl groups may be attached to the cycloaliphatic ring carbon atoms or to methylene side chains. They may be in any position on the cycloaliphatic ring, for example, 1,2-, 1,3-, 1,4- or 1,5. The hydroxymethyl groups may be similarly attached. The cycloaliphatic ring may contain substituent alkyl groups such as methyl or ethyl. Likewise various geometric isomers or mixtures of geometric isomers may be present such as cis- and transisomers. Excluded are compounds containing cyclopropyl rings.

Some useful cycloaliphatic diol compounds include trans-1,2-Cyclohexanediol, 1,4-Cyclohexanediol, cis-1,2-Cyclohexanedimethanol, 1,4-Cyclohexanedimethanol, 1,4-Cyclooctanediol, and cis-1,5-Cyclooctanediol. When the geometric isomer is not specified the cosolvent is a mixture of isomers produced from the synthesis method, e.g., a mixture of cis- and trans-isomers.

A major advantage of using the cosolvents described in this invention is their compatibility with pigment dispersions. However, the cosolvents can also be used in dye-based ink to impart rapid penetration of aqueous dye-based inks into the paper.

A further advantage is the absence of retardation of the ink drying on paper as shown in Table 4.

COLORANT

The colorant is selected from the group consisting of a pigment dispersion and a dye. The pigment dispersion comprises a pigment and usually a dispersant. Preferably, the dispersant is a polymeric dispersant.

DISPERSANTS

In addition to, or in place of a polymeric dispersant surfactant compounds may be used as dispersants. These may be anionic, cationic, nonionic or amphoteric. A detailed list of non-polymeric as well as some polymer dispersants are listed in the section on dispersants, pages 110–129, 1990 McCutcheon's Functional Materials, North American Edition, Manufacturing Confection Publishing Co., Glen Rock, N.J., 07452.

POLYMERIC DISPERSANTS

Polymeric dispersants suitable for practicing the invention include AB or BAB block copolymers wherein the A block is hydrophobic and serves to link with the pigment, and the B block is hydrophilic and serves to disperse the pigment in the aqueous medium. Selection of the polymer for a specific application will depend on the selected pigment and aqueous medium. In general, the polymer is an AB or BAB block copolymer wherein (a) the A segment is a hydrophobic homopolymer or copolymer of an acrylic monomer having the formula:

$$CH_2=C(X)(Y)$$

wherein X is H or $CH_3$; and Y is $C(O)OR_1$, $C(O)NR_2R_3$, or CN, wherein $R_2$ is an alkyl, aryl, or alkylaryl group having 1 to 20 carbon atoms, and $R_2$ and $R_3$ are hydrogen or an alkyl, aryl, or alkylaryl group having 1 to 9 carbon atoms; said A segment having an average molecular weight of at least approximately 300 and being water insoluble; and (b) the B segment is a hydrophilic polymer, or salt thereof, of (1) an acrylic monomer having the formula:

$$CH_2=C(X)(Y1)$$

wherein X is H or $CH_3$; and Y1 is C(O)OH, $C(O)NR_2R_3$, $C(O)OR_4NR_2R_3$ or $C(OR_5)$; wherein $R_2$ and $R_3$ are hydrogen or an alkyl, aryl, or alkylaryl group having 1 to 9 carbon atoms; $R_4$ is an alkyl diradical having 1 to 5 carbon atoms; and $R_5$ is an alkyl group having 1 to 20 carbon atoms and optionally containing one or more hydroxyl or ether groups; or (2) a copolymer of the acrylic monomer of (1) with an acrylic monomer having the formula:

$$CH_2=C(X)(Y)$$

where X and Y are the substituent groups defined for the A segment; the B segment having an average molecular weight of at least approximately 300 and being water soluble. The B block(s) generally will constitute 10 to 90%, preferably 25 to 65%, of the entire block polymer by weight.

The A block is a polymer or copolymer prepared from at least one acrylic monomer having the formula set forth above. The $R_1$, $R_2$ and $R_3$ groups optionally may contain hydroxy, ether, $OSi(CH_3)_3$ groups, and similar substituent groups. Representative monomers that may be selected include, but are not limited to, the following: methyl methacrylate (MMA), ethyl methacrylate (EMA), propyl methacrylate, n-butyl methacrylate (BMA or NBMA), hexyl methacrylate, 2-ethylhexyl methacrylate (EHMA), octyl methacrylate, lauryl methacrylate (LMA), stearyl methacrylate, phenyl methacrylate, benzyl methacrylate, hydroxyethyl methacrylate (HEMA), hydroxypropyl methacrylate, 2-ethoxyethyl methacrylate, methacrylonitrile, 2-trimethylsiloxyethyl methacrylate, glycidyl methacrylate(GMA), p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, benzyl acrylate, hydroxyethyl acrylate, hydroxypropyl acrylate, acrylonitrile, 2-trimethyl-siloxyethyl acrylate, glycidyl acrylate, p-tolyl acrylate, and sorbyl acrylate. Preferred A blocks are homopolymers and copolymers prepared from methyl methacrylate, butyl methacrylate, 2-ethylhexyl methacrylate, or copolymers of methyl methacrylate with butyl methacrylate.

The A block also may contain a hydrophilic monomer such as $CH_2=C(X)(Y)'$, wherein X is H or $CH_3$ and Y' is $C(O)OH$, $C(O)NR_2R_3$, $C(O)OR_4NR_2R_3$, $C(OR_5)$, or their salts, wherein $R_2$ and $R_3$ may be H or C1 to C9 alkyl, aryl, or alkylaryl, $R_4$ is a C1 to C5 alkyl diradical, and $R_5$ is a C1 to C20 alkyl diradical which may contain hydroxy or ether groups, to provide some changes in solubility. However, there should not be enough hydrophilic monomer present in the A block to render it, or its salt, completely water soluble.

The B block is a polymer prepared from at least one acrylic monomer having the formula provided above. Representative monomers include methacrylic acid (MAA), acrylic acid, dimethylaminoethyl methacrylate (DMAEMA), diethylaminoethyl methacrylate, t-butylaminoethyl methacrylate, dimethylaminoethyl acrylate, diethylaminoethyl acrylate, dimethylaminopropyl methacrylamide, methacrylamide, acrylamide, and dimethylacrylamide. Homopolymers or copolymers of methacrylic acid or dimethylaminoethyl methacrylate are preferred.

The acid containing polymer may be made directly or may be made from a blocked monomer with the blocking group being removed after polymerization. Examples of blocked monomers that generate acrylic or methacrylic acid after removal of the blocking group include: trimethylsilyl methacrylate (TMS-MAA), trimethylsilyl acrylate, 1-butoxyethyl methacrylate, 1-ethoxyethyl methacrylate, 1-butoxyethyl acrylate, 1-ethoxyethyl acrylate, 2-tetrahydropyranyl acrylate, and 2-tetrahydropyranyl methacrylate.

The B block may be a copolymer of an acid or amino containing monomer with other monomers, such as those used in the A block. The acid or amino monomer may be used in a range of 10 to 100%, preferable in a range of 20 to 100%, of the B block composition. The B block(s) generally will constitute 10 to 90%, preferably 25 to 65%, of the entire block polymer by weight.

Block copolymers that are useful in practicing the invention have a number average molecular weight below 20,000, preferably below 15,000, and typically in the range of 1,000 to 3,000. Preferred block copolymers have number average molecular weights in the range of 500 to 1500 for each A and B block.

Representative AB and BAB block polymers that may be selected include the following, wherein the values recited represent the degree of polymerization of each monomer. A double slash indicates a separation between blocks and a single slash indicates a random copolymer. For example, MMA//MMA/MMA 10//5/7.5 is an AB block polymer with an A block of MMA that is 10 monomer units long, molecular weight of 1000 and a B block that is a copolymer of MMA and MAA with 5 monomer units of MMA and 7.5 units of MAA; molecular weight of the B block is 1145.

|  | MOL. WEIGHT |
|---|---|
| AB BLOCK POLYMER |  |
| EHMA//EHMA/MAA |  |
| 3//3/5 | 1618 |
| 5//2.5/2.5 | 1700 |
| 5//5/10 | 2840 |
| 20//10/10 | 6800 |
| 15//11/22 | 7040 |
| EHMA//LMA/MAA |  |
| 10//10/12 | 5552 |
| EHMA//MMA/EHMA/MAA |  |
| 10//5/5/12 | 4502 |
| EHMA//MMA/MAA |  |
| 5//5/10 | 2350 |
| 5//10/10 | 2850 |
| EHMA//MAA |  |
| 15//5 | 3400 |
| BMA//BMA/MAA |  |
| 5//2.5/2.5 | 1280 |
| 10//5/10 | 3000 |
| 20//10/20 | 6000 |
| 15//7.5/3 | 3450 |
| 5//5/10 | 2300 |
| 5//10/5 | 2560 |
| BMA//MMA/MAA |  |
| 15//15/5 | 4060 |
| 15//7.5/3 | 3140 |
| 10//5/10 | 2780 |
| MMA//MMA/MAA |  |
| 10//5/10 | 2360 |
| 10//5/5 | 1930 |
| 10//5/7.5 | 2150 |
| 20//5/7.5 | 3150 |
| 15/7.5/3 | 2770 |
| MMA//EHMA/MAA |  |
| 5//5/10 | 2350 |
| 10//5/10 | 2850 |
| BMA/MMA//BMA/MAA |  |
| 5/5//5/10 | 2780 |
| BMA//MAA |  |
| 10//10 | 2260 |
| BMA//HEMA/MAA |  |
| 15//7.5/3 | 3360 |
| 7.5//7.5/3 | 2300 |
| 15//7.5/7.5 | 3750 |
| BMA//BMA/DMAEMA |  |
| 10//5/10 | 3700 |
| BMA//BMA/DMAEMA/MAA |  |
| 10//5/5/5 | 2635 |
| BAB BLOCK POLYMER |  |
| BMA/MAA//BMA//BMA/MAA |  |
| 5/10//10//5/10 | 4560 |
| MMA/MAA//MMA//MMA/MAA |  |
| 5/7.5//10//5/7.5 | 3290 |

Preferred block polymers are methyl methacrylate//methyl methacrylate/methacrylic acid (10//5/7.5), 2-ethylhexyl methacrylate//2-ethylhexyl methacrylate/methacrylic acid (5//5/10), n-butyl methacrylate//n-butyl methacrylate/methacrylic acid (10//5/10), n-butyl methacrylate//methacrylic acid (10//10)), ethylhexyl methacrylate//methyl methacrylate/methacrylic acid (5//10/10), n-butylmethacrylate//2-hydroxyethyl methacrylate/methacrylic acid (5//10/10), n-butylmethacrylate//2-hydroxyethyl methacrylate/methacrylic acid (15//7.5/3), methyl methacrylate//ethylhexyl methacrylate/methacrylic acid (5//5/10), and butyl methacrylate//butyl methacrylate/dimethylaminoethyl methacrylate (10//5/10).

To solubilize the B block into the aqueous medium, it may be necessary to make salts of either the acid or amino groups contained in the B block. Salts of the acid monomers can be made with the counter component being selected from organic bases such as mono-, di-, tri-methylamine, morpholine, n-methyl morpholine; alcohol amines such as dimethylethanolamine (DMEA), methyldiethanolamine, mono-, di-, and tri-ethanolamine; pyridine; ammonium hydroxide; tetra-alkylammonium salts such as tetramethylammonium hydroxide, tetraethylammonium hydroxide; alkali metals such as lithium, sodium and potassium, and the like. Preferred neutralizing agents include dimethylethanolamine and sodium and potassium hydroxides, with potassium hydroxide being particularly preferred for inks to be used in thermal ink jet printers. Salts of the amino monomers can be made with the counter component being selected from organic acids such as acetic acid, formic acid, oxalic acid, dimethylol propionic acid, halogens such as chloride, fluoride, and bromide, and other inorganic acids, such as sulfuric acid, nitric acid, phosphoric acid and the like. It is also possible to convert the amino group into a tetra-alkyl ammonium salt. Amphoteric polymers, that is polymer that contains both an acid group and an amino group, may be used as is or can be neutralized with either addition of acid or base.

The AB and BAB polymers can be advantageously produced by a stepwise polymerization process such as anionic or group transfer polymerization as described in Webster, U.S. Pat. No. 4,508,880, the disclosure of which is incorporated herein by reference. Polymers so produced have precisely controlled molecular weight, block sizes and very narrow molecular weight distributions. The polymer typically has a dispersity less than 2, generally in the range of 1.0 to 1.4. Dispersity is the polymer weight average molecular weight divided by its number average molecular weight. Number average molecular weight can be determined by gel permeation chromatography (GPC). The AB or BAB block polymers may also be formed by free radical polymerization wherein the initiation unit is comprised of two different moieties which initiate polymerization at two distinctly different temperatures. However, this method may cause contamination of the block copolymers with homopolymer and coupled products.

The AB block polymers also may be prepared using conventional anionic polymerization techniques, in which a first block of the copolymer is formed, and upon completion of the first block, a second monomer stream is started to form a subsequent block of the polymer. A low reaction temperature, e.g., 0° to −70° C., is maintained in this case to minimize side reactions and form blocks of the desired molecular weights.

With many of these techniques, and especially with the group transfer polymerization process, the initiator may be non-functional, may contain an acid group (used as is or in a blocked form) or may contain an amino group. Either the hydrophobic A block or the hydrophilic B block may be made first. The BAB block polymers also may be prepared by anionic polymerization or group transfer polymerization techniques by first polymerizing one of the B Blocks, then polymerizing the hydrophobic A block, and then polymerizing the second B Block.

Although random copolymers can be used as dispersants they are not as effective in stabilizing pigment dispersions. Amongst these may be mentioned half-esters of maleic acid/styrene copolymers, lignin sulfonate derivatives and copolymers of acrylic and methacrylic acid with styrene.

PIGMENTS

A wide variety of organic and inorganic pigments, alone or in combination, may be selected to make the ink. The term "pigment" as used herein means an insoluble colorant. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 15 micron. Preferably, the pigment particle size should range from 0.005 to 5 micron, next preferably from 0.005 to 1 micron and, most preferably, from 0.005 to 0.3 micron.

The selected pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation in the process of preparing the inks from dry pigments. Representative commercial dry pigments that may be used in practicing the invention include the following:

| Pigment Brand Name | Manufacturer | Color Index Pigment |
| --- | --- | --- |
| Permanent Yellow DHG | Hoechst | Yellow 12 |
| Permanent Yellow GR | Hoechst | Yellow 13 |
| Permanent Yellow G | Hoechst | Yellow 14 |
| Permanent Yellow NCG-71 | Hoechst | Yellow 16 |
| Permanent Yellow GG | Hoechst | Yellow 17 |
| Hansa Yellow RA | Hoechst | Yellow 73 |
| Hansa Brilliant Yellow 5GX-02 | Hoechst | Yellow 74 |
| Dalamar ® Yellow YT-858-D | Heubach | Yellow 74 |
| Hansa Yellow X | Hoechst | Yellow 75 |
| Novoperm ® Yellow HR | Hoechst | Yellow 83 |
| Chromophtal ® Yellow 3G | Ciba-Geigy | Yellow 93 |
| Chromophtal ® Yellow GR | Ciba-Geigy | Yellow 95 |
| Novoperm ® Yellow FGL | Hoechst | Yellow 97 |
| Hansa Brilliant Yellow 10GX | Hoechst | Yellow 98 |
| Permanent Yellow G3R-01 | Hoechst | Yellow 114 |
| Chromophtal ® Yellow 8G | Ciba-Geigy | Yellow 128 |
| Irgazin ® Yellow 5GT | Ciba-Geigy | Yellow 129 |
| Hostaperm ® Yellow H4G | Hoechst | Yellow 151 |
| Hostaperm ® Yellow H3G | Hoechst | Yellow 154 |
| L74-1357 Yellow | Sun Chem. | |
| L75-1331 Yellow | Sun Chem. | |
| L75-2377 Yellow | Sun Chem. | |
| Hostaperm ® Orange GR | Hoechst | Orange 43 |
| Paliogen ® Orange | BASF | Orange 51 |
| Irgalite ® Rubine 4BL | Ciba-Geigy | Red 57:1 |
| Quindo ® Magenta | Mobay | Red 122 |
| Indofast ® Brilliant Scarlet | Mobay | Red 123 |
| Hostaperm ® Scarlet GO | Hoechst | Red 168 |
| Permanent Rubine F6B | Hoechst | Red 184 |
| Monastral ® Magenta | Ciba-Geigy | Red 202 |
| Monastral ® Scarlet | Ciba-Geigy | Red 207 |
| Heliogen ® Blue L 6901F | BASF | Blue 15:2 |
| Heliogen ® Blue NBD 7010 | BASF | |
| Heliogen ® Blue K 7090 | BASF | Blue 15:3 |
| Heliogen ® Blue L 7101F | BASF | Blue 15:4 |
| Paliogen ® Blue L 6470 | BASF | Blue 60 |
| Heucophthal ® Blue G, XBT-583D | Heubach | Blue 15:3 |
| Heliogen ® Green K 8683 | BASF | Green 7 |
| Heliogen ® Green L 9140 | BASF | Green 36 |
| Monastral ® Violet R | Ciba-Geigy | Violet 19 |
| Monastral ® Red B | Ciba-Geigy | Violet 19 |
| Quindo ® Red R6700 | Mobay | Violet 19 |

-continued

| Pigment Brand Name | Manufacturer | Color Index Pigment |
| --- | --- | --- |
| Quindo ® Red R6713 | Mobay | Violet 19 |
| Indofast ® Violet | Mobay | Violet 23 |
| Monastral ® Violet Maroon B | Ciba-Geigy | Violet 42 |
| Monarch ® 1400 | Cabot | Black 7 |
| Monarch ® 1300 | Cabot | Black 7 |
| Monarch ® 1100 | Cabot | Black 7 |
| Monarch ® 1000 | Cabot | Black 7 |
| Monarch ® 900 | Cabot | Black 7 |
| Monarch ® 880 | Cabot | Black 7 |
| Monarch ® 800 | Cabot | Black 7 |
| Monarch ® 700 | Cabot | Black 7 |
| Raven 7000 | Columbian | Black 7 |
| Raven 5750 | Columbian | Black 7 |
| Raven 5250 | Columbian | Black 7 |
| Raven 5000 | Columbian | Black 7 |
| Raven 3500 | Columbian | Black 7 |
| Color Black FW 200 | Degussa | Black 7 |
| Color Black FW 2 | Degussa | Black 7 |
| Color Black FW 2V | Degussa | Black 7 |
| Color Black FW 1 | Degussa | Black 7 |
| Color Black FW 18 | Degussa | Black 7 |
| Color Black S 160 | Degussa | Black 7 |
| Color Black S 170 | Degussa | Black 7 |
| Special Black 6 | Degussa | Black 7 |
| Special Black 5 | Degussa | Black 7 |
| Special Black 4A | Degussa | Black 7 |
| Special Black 4 | Degussa | Black 7 |
| Printex U | Degussa | Black 7 |
| Printex V | Degussa | Black 7 |
| Printex 140U | Degussa | Black 7 |
| Printex 140V | Degussa | Black 7 |
| Tipure ® R-101 | Du Pont | White 6 |

Representative commercial pigments that can be used in the form of a water wet presscake include: Heucophthal ® Blue BT-585-P, Toluidine Red Y (C.I. Pigment Red 3), Quindo ® Magenta (Pigment Red 122), Magenta RV-6831 presscake (Mobay Chemical, Harmon Division, Haledon, N.J.), Sunfast ® Magenta 122 (Sun Chemical Corp., Cincinnati, Ohio), Indo ® Brilliant Soarlet (Pigment Red 123, C.I. No. 71145), Toluidine Red B (C.I. Pigment Red 3), Watchung ® Red B (C.I. Pigment Red 48), Permanent Rubine F6B13-1731 (Pigment Red 184), Hansa ® Yellow (Pigment Yellow 98), Dalamar ® Yellow YT-839-P (Pigment Yellow 74, C.I. No. 11741, Sunbrite ® Yellow 17 (Sun Chemical Corp, Cincinnati, Ohio), Toluidine Yellow G (C.I. Pigment Yellow 1), Pigment Scarlet (C.I. Pigment Red 60), Auric Brown (C.I. Pigment Brown 6), etc. Black pigments, such as carbon black, generally are not available in the form of aqueous presscakes.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

DYES

Dyes commonly used in aqueous ink jet inks include for example Acid, Direct, Food and Reactive dyes.

Some useful dyes that may be mentioned are:

C.I. Food Blacks 1 and 2.

C.I. Acid Blacks 7, 24, 26, 48, 52, 58, 60, 107, 109, 118, 119, 131, 140, 155, 156 and 187.

C.I. Direct Blacks 17, 19, 32, 38, 51, 71, 74, 75, 112, 117, 154, 163, and 168.

C.I. Acid Reds 1, 8, 17, 32, 35, 37, 42, 57, 92, 115, 119, 131, 133, 134, 154, 186, 249, 254, and 256.

C.I. Direct Reds 37, 63 , 75, 79, 80, 83, 99, 220, 224 and 227.

C.I. Acid Violets 11, 34 and 75.

C.I. Direct Violets 47, 48, 51, 90 and 94.

C.I. Reactive Reds 4, 23, 24, 31 and 56.

C.I. Acid Blues 9, 29, 62, 102, 104, 113, 117, 120, 175 and 183.

C.I. Direct Blues 1, 6, 8, 15, 25, 71, 76, 78, 80, 86, 90, 106, 108, 123, 163, 165, 199 and 226.

C.I. Reactive Blues 7 and 13.

C.I. Acid Yellows 3, 17, 19, 23, 25, 29, 38, 49, 59, 61 and 72.

C.I. Direct Yellows 27, 28, 33, 39, 58, 86, 100 and 142.

C.I. Reactive Yellow 2.

AQUEOUS CARRIER MEDIUM

The aqueous carrier medium is water or a mixture of water and at least one water soluble organic solvent other than the cycloaliphatic diol compound.

Deionized water is commonly used. Selection of a suitable mixture of water and water soluble organic solvent, depends on requirements of the specific application, such as desired surface tension and viscosity, the selected pigment, drying time of the pigmented ink jet ink, and the type of paper onto which the ink will be printed.

Representative examples of water-soluble organic solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol, 1,2,6-hexanetriol and thiodiglycol; (6) lower alkyl mono-or di-ethers derived from alkylene glycols, such as ethylene glycol monomethyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

A mixture of a water soluble organic solvent having at least 2 hydroxyl groups such as, diethylene glycol and water is preferred as the aqueous carrier medium. In the case of a mixture of water, diethylene glycol and cycloaliphatic diol, the aqueous carrier medium plus cycloaliphatic diol usually contains from about 30% water/70% solvent/cycloaliphatic diol mixture to about 95% water/5% solvent/cycloaliphatic diol mixture. The preferred ratios are approximately 60% water/40% solvent/cycloaliphatic diol mixture to about 95% water/5% solvent/cycloaliphatic diol mixture. The solvent/cycloaliphatic diol mixture contains 15-95% cycloaliphatic diol, preferably 25-75%.

Percentages are based on the total weight of the aqueous carrier medium plus cycloaliphatic diol.

OTHER INGREDIENTS

The ink may contain other ingredients. For example, surfactants may be used to alter surface tension as well as promote penetration. However, they may also destabilize pigmented inks. Surfactants may be anionic, cationic, amphoteric or nonionic. Useful surfactants may be selected from McCutcheon's Emulsifiers and Detergents, published by Manufacturing Confectioners Publishing Company, Glen Rock, N.J. The choice of surfactant is highly dependent on the type of paper to be printed. It is expected that one skilled in the art can select the appropriate surfactant for the specific paper to be used in printing.

For example, the following surfactants were found to be useful in printing on Gilbert Bond paper (25% cotton) designated style 1057 manufactured by Mead Company, Dayton, Ohio.

| Supplier and Tradename | Description |
| --- | --- |
| Air Products | |
| Surfynol ® 465H | Ethoxylated Tetramethyl Decynediol |
| Surfynol ® CT-136 | Acetylenic Diol, Anionic Surfactant Blend |
| Surfynol ® GA | Acetylenic Diol Blend |
| Surfynol ® TG | Acetylenic Diol Blend in Ethylene Glycol |
| Cyanamid | |
| Aerosol ® OT | Dioctyl Ester of Sodium Sulfosuccinic Acid Aerosol ® MA-80 Dihexyl Ester of Sodium Sulfosuccinic Acid Aerosol ® MA-80/Aerosol OT 2/1 |
| Du Pont | |
| Duponol ® RA | Fortified Sodium Ether-Alcohol Sulfate |
| Merpol ® A | Ethylene Oxide, Ester Condensate |
| Merpol ® LF-H | Polyether |
| Merpol ® SE | Alcohol Ethoxylate |
| Merpol ® SH | Ethylene Oxide Condensate |
| Zelec ® NK | Alcohol Phosphate Composition |
| Fisher Scientific | |
| Polyethylene Glycol 3350 | |
| Polyethylene Glycol 400 | |
| Polyethylene Glycol 600 | |
| ICI | |
| Renex ® 30 | Polyoxyethylene (12) Tridecyl Ether |
| Synthrapol ® KB | Polyoxyethylene Alkyl Alcohol |
| Rohm & Haas | |
| Triton ® CF 10 | Alkylaryl Polyether |
| Triton ® CF 21 | Alkylaryl Polyether |
| Triton ® N 111 | Nonylphenoxy |
| Triton ® X-100 | Polyethoxy Ethanol |
| Triton ® X-102 | Octylphenoxy Polyethoxy Ethanol |
| Triton ® X-114 | Octylphenoxy Polyethoxy Ethanol |
| Union Carbide | |
| Silwet ® L-7600 | Polyalkyleneoxide Modified Polydimethylsiloxane |
| Silwet ® L-7607 | Polyalkyleneoxide Modified Polydimethylsiloxane |
| Silwet ® L-77 | Polyalkyleneoxide Modified Polydimethylsiloxane |
| UCON ® ML1281 | Polyalkylene Glycol |

-continued

| Supplier and Tradename | Description |
| --- | --- |
| W. R. Grace | |
| Hampshire Div., Hamposyl ® Lida | Lauryoyl Iminodiacetic Acid. |

In aqueous inks, the surfactants may be present in the amount of 0.01-5% and preferably 0.2-2%.

Biocides may be present to inhibit growth of microorganisms. Dowicides (Dow Chemical, Midland, Mich. 48674), Omidines ® (Olin Corp, Cheshire, Conn. 06410), Nopcocides (Henkel Corp, Ambler, Pa. 19002) Troysans (Troy Chemical Corp Newark, N.J. 17105) and sodium benzoate may be used.

In addition, sequestering agents such as EDTA may also be included to eliminate deleterious effects of heavy metal impurities.

INK PREPARATION

The pigmented ink is prepared by premixing the selected pigment(s) and dispersant in water. In the case of dyes some of the same factors apply except that there is no dispersant present and no need for pigment deaggregation. The dye-based ink is prepared in a well agitated vessel rather than in dispersing equipment. Cosolvents and cycloaliphatic diol compounds may be present during the dispersion.

The dispersing step may be accomplished in a horizontal mini mill, a ball mill, an attritor, or by passing the mixture through a plurality of nozzles within a liquid jet interaction chamber at a liquid pressure of at least 1000 psi to produce a uniform dispersion of the pigment particles in the aqueous carrier medium.

It is generally desirable to make the pigmented ink jet ink in concentrated form. The concentrated pigmented ink jet ink, which is subsequently diluted to the appropriate concentration for use in the ink jet printing system. This technique permits preparation of a greater quantity of pigmented ink from the equipment. If the pigment dispersion is made in a solvent, it is diluted with water and optionally other solvents to obtain the appropriate concentration. If the pigment dispersion is made in water, it is diluted with either additional water or water soluble solvents to make a pigment dispersion of the desired concentration. By dilution, the ink is adjusted to the desired viscosity, color, hue, saturation density, and print area coverage for the particular application.

In the case of organic pigments, the ink may contain up to approximately 30% pigment by weight, but will generally be in the range of approximately 0.1 to 15%, preferably approximately 0.1 to 8%, by weight of the total ink composition for most thermal ink jet printing applications. If an inorganic pigment is selected, the ink will tend to contain higher weight percentages of pigment than with comparable inks employing organic pigment, and may be as high as approximately 75% in some cases, because inorganic pigments generally have higher specific gravities than organic pigments. The acrylic block polymer is present in the range of approximately 0.1 to 30% by weight of the total ink composition, preferably in the range of approximately 0.1% to 8%. If the amount of polymer becomes too high, the ink color density will be unacceptable and it will become difficult to maintain desired ink viscosity. Dispersion stability of the pigment particles is adversely affected if insufficient acrylic block copolymer is present. The amount of aqueous carrier medium plus penetrant is in the range of approximately 70 to 99.8%, preferably approximately 94 to 99.8%, based on total weight of the ink when an organic pigment is selected, approximately 25 to 99.8%, preferably approximately 70 to 99.8% when an inorganic pigment is selected and 80 to 99.8% when a dye is selected.

Other additives, such as surfactants, biocides, humectants, chelating agents, and viscosity modifiers may be added to the ink. Optionally, other acrylic and non-acrylic polymers, may be added to improve properties such as water fastness and smear resistance.

Jet velocity, separation length of the droplets, drop size, and stream stability are greatly affected by the surface tension and the viscosity of the ink. Pigmented ink jet inks suitable for use with ink jet printing systems should have a surface tension in the range of about 20 dyne/cm to about 70 dyne/cm and, more preferably, in the range 30 dyne/cm to about 70 dyne/cm. Acceptable viscosities are no greater than 20 cP, and preferably in the range of about 1.0 cP to about 10.0 cP. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. The inks have excellent storage stability for a long period and do not clog in an ink jet apparatus. Fixing the ink on the image recording material, such as, paper, fabric, film, etc., can be carried out rapidly and accurately. An ink prepared by mixing an aqueous pigment dispersion with the cycloaliphatic diol, diethylene glycol solvent and a surfactant dries on bond test paper in less than 15 seconds.

The printed ink images have clear color tones, high density, excellent water resistance and lightfastness. Furthermore, the ink does not corrode parts of the ink jet printing device it comes in contact with, and it is essentially odorless, and non-toxic.

EXAMPLES

The following examples serve to illustrate the practice of the present invention.

EXAMPLES 1-6

Ink was prepared as follows:

Dispersant Preparation

A block copolymer of n-butyl methacrylate and methacrylic acid was prepared as follows:

3750 grams of tetrahydrofuran, 7.4 grams of p-xylene, were added to a 12-liter flask equipped with a mechanical stirrer, thermometer, nitrogen inlet, drying tube outlet, and addition funnels. The catalyst, tetrabutyl ammonium m-chlorobenzoate, 3.0 ml of a 1.0M solution in acetonitrile, was then added to the flask. 291.1 grams (1.25M) of an initiator, 1,1-bis(trimethylsiloxy)-2-methyl propene, were injected. Feed I which consisted of tetrabutyl ammonium m-chlorobenzoate, and 3.0 ml of a 1.0M solution in acetonitrile, was started and added over 150 minutes. Feed II which consisted of 1976 gm (12.5M) trimethylsilyl methacrylate, was started at 0.0 minutes and added over 35 minutes. One hundred and eighty minutes after Feed II was completed over 99 % of the monomers had reacted. Feed III, which consisted of 1772 gm (12.5M) butyl methacrylate, was started and added over 30 minutes.

At 400 minutes, 780 grams of dry methanol were added to the above solution and distillation commenced. During the first stage of distillation, 1300.0 grams of material with a boiling point below 55° C. were removed from the flask. The theoretical amount of methoxytrimethylsilane, having a boiling point of 54° C. (BP=54° C.) to be removed was 1144.0 grams. Distillation continued during the second stage while the boiling point increased to 76° C. 5100 gms of isopropanol were added during the second stage of distillation. A total of 7427 grams of solvent were removed. The resultant resin solution was used directly in the next step. It contained 55.8% solids and had a neutralization equivalent of 4.65 milliequivalents of potassium hydroxide per gram of solids.

Neutralization of Dispersant

The following materials were added to a 1000 ml cylindrical polyethylene bottle:
200.0 grams dispersant solution
174.4 grams 15% potassium hydroxide
137.6 grams deionized water The mixture was tumbled on a roller mill for 3-4 hours and then magnetically stirred for 16-20 hours to give a slightly cloudy solution.

Preparation of Pigment Dispersion

The following materials were added to a 1 liter beaker:
78.3 grams deionized water
66.7 grams neutralized dispersant solution
3.0 grams 15% potassium hydroxide. The solution was mechanically stirred while 20.0 grams of carbon black pigment, FW 18 (Degussa Corp., Ridgefield Park, N.J. 07660) was added in portions. Stirring was continued for 30 minutes. The contents were then added to a Mini Motormill 100 (Eiger Machinery Inc., Bensenville, Ill. 60106) with another 32 grams of deionized water as a rinse. The contents were milled at 3500 rpm for one hour. The yield was 190.8 grams. The pH was 7.6. The particle size was 138 nm as determined by a Brookhaven BI-90 Particle analyzer (Brookhaven Instruments Corp., Holtsville, N.Y. 11742).

Preparation of Inks

The following ingredients were combined and added with magnetic stirring over 10-15 minutes to 22.5 grams of pigment dispersion:
2.6 grams diethylene glycol (Aldrich Chemical Co. Inc., Milwaukee, Wis. 53233)
2.6 grams comparative cosolvent or cycloaliphatic diol
0.5 grams Silwet ® L-77 (Union Carbide Corp., Danbury, Conn. 06817)
37.2 grams deionized water

TABLE 1: CONTROL COSOLVENT AND CYCLOALIPHATIC DIOL IDENTIFICATION

All comparative cosolvents and cycloaliphatic diols were obtained from Aldrich Chemical Co. Inc., Milwaukee, Wis. 53233 unless otherwise stated. A cosolvent or cycloaliphatic diol was added to the ink as previously discussed. The cosolvents and cycloaliphatic diol pluggage inhibitors are identified as follows:

| Comparative Cosolvents | Control # |
|---|---|
| Butyl Carbitol (Union Carbide Corp., | 1 |

| | -continued | |
|---|---|---|
| Danbury, CT) | | |
| Dowanol TBH, (Dow Chemical, Midland MI 48640) | | 2 |
| Dipropylene Glycol | | 3 |
| Hexylene Glycol | | 4 |
| Triethylene Glycol | | 5 |
| Glycerol | | 6 |
| 1,2,7,8-Octanetetrol | | 7 |

| Cycloaliphatic Diol Pluggage Inhibitors | Example # |
|---|---|
| trans-1,2-Cyclohexanediol | 1 |
| 1,4-Cyclohexanediol* | 2 |
| cis-1,2-Cyclohexanedimethanol | 3 |
| 1,4-Cyclohexanedimethanol* | 4 |
| 1,4-Cyclooctanediol* | 5 |
| cis-1,5-Cyclooctanediol | 6 |

*"natural" mixture of cis- and trans-isomers

TABLE 2: DECAP TIMES

Decap times were obtained on a Deskjet printer that had been altered so that the ink cartridge would not be vacuum suctioned nor spit into a spittoon. The last time interval in which the particular drop did not fail is recorded. In the "decap" or "crust" test a series of drops is fired in succession for every nozzle in the ink jet pen. These ejections are carried out at successively greater time intervals and the interval at which the first nozzle fails is recorded for the first, fifth and thirty-second drop. These values are known as decap time or crust time.

| Sample | | 1st seconds | 5th minutes | 32nd Drop minutes |
|---|---|---|---|---|
| Control | 1 | 90 | 1 | 1.5 |
| | 2 | 60 | 1 | 3.0 |
| | 3 | 40 | 0.5 | 1.5 |
| | 4 | 35 | 1 | 1.5 |
| | 5 | 25 | 0.75 | 1.0 |
| | 6 | 90 | 3 | 5 |
| | 7 | 50 | 1.5 | 360 |
| Example | 1 | 50 | 1.2 | 5 |
| | 2 | 60 | 60 | 240 |
| | 3 | 85 | 180 | 360 |
| | 4 | 60 | 60 | 840 |
| | 5 | 45 | 360 | 720+ |
| | 6 | 60 | 720 | 1080+ |

TABLE 3: DISPERSION STABILITY

Dispersion stability was obtained by subjecting 15 grams of ink to four temperature cycles, each consisting of 4 hours at −20° C. and 4 hours at 60° C. Particle sizes were measured on a Brookhaven BI-90 (Brookhaven Instruments Corp., Holtsville, N.Y. 11742) before and after cycling.

| Sample | | Change in Particle Size, delta nanometers |
|---|---|---|
| Control | 1 | 36 |
| | 2 | 22 |
| | 3 | 2 |
| | 4 | 4 |
| | 5 | −5 |
| | 6 | 23 |
| | 7 | 144 |
| Example | 1 | −2 |
| | 2 | 0 |
| | 3 | 5 |
| | 4 | 15 |
| | 5 | 4 |
| | 6 | 2 |

TABLE 4: DRYING TIMES

Drying times were obtained by printing rapidly a series of solid patterns on a Hewlett Packard DeskJet printer (Hewlett Packard Co., Palo Alto, Calif. 94303) and immediately wiping them in 15 second increments, and recording the time in which the printed ink would no longer smear. A semiabsorbent paper, Gilbert Bond (Mead Co., Dayton, Ohio) was used.

| Sample | | Dry Time, seconds |
|---|---|---|
| Control | 1 | <15 |
| | 2 | <15 |
| | 3 | 15-30 |
| | 4 | 15-30 |
| | 5 | 30-45 |
| | 6 | 30-45 |
| | 7 | 15-30 |
| Example | 1 | 30-45 |
| | 2 | 15-30 |
| | 3 | <15 |
| | 4 | 15-30 |
| | 5 | 15-30 |
| | 6 | 15-30 |

What is claimed is:

1. An aqueous ink jet ink composition comprising:
   (a) an aqueous carrier medium comprising at least 60% water,
   (b) a colorant selected from the group consisting of a pigment dispersion and a dye; and
   (c) a cycloaliphatic diol having a solubility in water of at least 4.5 parts in 100 parts of water at 25° C., and having the general formula: $C_nH_{2n-2}(OH)_2$ wherein n is at least 6 or $C_nH_{2n-2}(CH_2OH)_2$ wherein n is at least 5.

2. The ink composition of claim 1 wherein the pigment dispersion comprises a pigment and a dispersant.

3. The ink composition of claim 2 wherein the dispersant is a polymeric dispersant.

4. The ink composition of claims 1 or 3 wherein n=6−12.

5. The ink composition of claims 1 or 3 in which n=6−10.

6. The ink composition of claim 3 wherein the cycloaliphatic diol comprises a mixture of cis- and trans-isomers.

7. The ink composition of claim 3 wherein the cycloaliphatic diol comprises a 1,2-substituted cycloaliphatic ring.

8. The ink composition of claim 3 wherein the cycloaliphatic diol comprises a 1,3-substituted cycloaliphatic ring.

9. The ink composition of claim 3 wherein the cycloaliphatic diol comprises a 1,4-substituted cycloaliphatic ring.

10. The ink composition of claim 3 wherein the cycloaliphatic diol comprises a 1,5-substituted cycloaliphatic ring.

11. The ink composition of claim 1 wherein the cycloaliphatic diol has the general formula:

$$C_nH_{2n-2}(CH_2OH)_2$$

and wherein n is at least 5.

12. The ink composition of claim 11 wherein n=6−8.

13. The ink composition of claim 7 wherein the cycloaliphatic diol is trans-1,2-cyclohexanediol.

14. The ink composition of claim 6 or 9 wherein the cycloaliphatic diol is 1,4-cyclohexanediol.

15. The ink composition of claims 7 or 11 wherein the cycloaliphatic diol is cis-1,2-cyclohexanedimethanol.

16. The ink composition of claims 6 or 9 wherein the cycloaliphatic diol is 1,4-cyclooctanediol.

17. The ink composition of claim 10 wherein the cycloaliphatic diol is cis-1,5-cyclooctanediol.

18. The ink composition of claims 6, 9 or 11 wherein the cycloaliphatic diol is 1,4-cyclohexanedimethanol.

19. The pigmented ink composition of claim 3 wherein the dispersant is an AB or BAB block copolymer wherein (a) the A segment is a hydrophobic homopolymer or copolymer of an acrylic monomer having the formula:

$$CH_2=C(X)(Y)$$

wherein X is H or $CH_3$; and Y is $C(O)OR_1$, $C(O)NR_2R_3$, or CN, wherein $R_2$ is an alkyl, aryl, or alkylaryl group having 1 to 20 carbon atoms, and $R_2$ and $R_3$ are hydrogen or an alkyl, aryl, or alkylaryl group having 1 to 9 carbon atoms; said A segment having an average molecular weight of at least approximately 300 and being water insoluble; and (b) the B segment is a hydrophilic polymer, or salt thereof, of (1) an acrylic monomer having the formula:

$$CH_2=C(X)(Y1)$$

wherein X is H or $CH_3$; and Y1 is C(O)OH, $C(O)NR_2R_3$, $C(O)OR_4NR_2R_3$ or $C(OR_5)$; wherein $R_2$ and $R_3$ are hydrogen or an alkyl, aryl, or alkylaryl group having 1 to 9 carbon atoms; $R_4$ is an alkyl diradical having 1 to 5 carbon atoms; and $R_5$ is an alkyl group having 1 to 20 carbon atoms and optionally containing one ore more hydroxyl or ether groups; or (2) a copolymer of the acrylic monomer of (1) with an acrylic monomer having the formula:

$$CH_2=C(X)(Y)$$

where X and Y are the substituent groups defined for the A segment; the B segment having an average molecular weight of at least approximately 300 and being water soluble.

20. The pigmented ink composition of claim 19 wherein the polymeric dispersant is an AB or BAB block copolymer wherein the A segment of said block copolymer is a homopolymer or copolymer prepared from at least one monomer selected from the group consisting of methyl methacrylate, ethyl methacrylate, propyl methacrylate, butyl methacrylate, hexyl methacrylate, 2-ethylhexyl methacrylate, octyl methacrylate, lauryl methacrylate, stearyl methacrylate, phenyl methacrylate, benzyl methacrylate, hydroxyethyl methacrylate, hydroxypropyl methacrylate, 2-ethoxyethyl methacrylate, methacrylonitrile, 2-trimethylsiloxyethyl methacrylate, glycidyl methacrylate, p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, benzyl acrylate, hydroxyethyl acrylate, hydroxypropyl acrylate, acrylonitrile, 2-trimethyl-siloxyethyl acrylate, glycidyl acrylate, p-tolyl acrylate, and sorbyl acrylate.

21. The pigmented ink composition of claim 20 wherein the A segment of said block copolymer is a homopolymer or copolymer prepared from methyl methacrylate, n-butyl methacrylate, 2-ethylhexyl methacrylate or a copolymer of methyl methacrylate with butyl methacrylate.

22. The pigmented ink composition of claim 21 wherein the A segment is n-butyl methacrylate.

23. The pigmented ink composition of claim 19 wherein the B segment of said block copolymer is a homopolymer or copolymer prepared from at least one monomer selected from the group consisting of methacrylic acid, acrylic acid, dimethylaminoethyl methacrylate, diethylaminoethyl methacrylate, t-butylaminoethyl methacrylate, dimethylaminoethyl acrylate, diethylaminoethyl acrylate, dimethylaminopropyl methacrylamide, methacrylamide, acrylamide, and dimethylacrylamide.

24. The pigmented ink composition of claim 23 wherein the B segment of said block copolymer is a polymer of methacrylic acid or dimethylaminoethyl methacrylate.

25. The pigmented ink composition of claim 24 wherein the B segment of said block copolymer is a homopolymer polymer of methacrylic acid.

26. The pigmented ink composition of claim 19 wherein said ink contains approximately 0.1 to 15% pigment, 0.1 to 30% block copolymer, and 70 to 99.8% aqueous carrier medium plus cycloaliphatic diol.

27. The pigmented ink composition of claim 26 wherein the aqueous carrier medium comprises water and at least one water soluble organic solvent.

28. The pigmented ink composition of claim 27 wherein aqueous carrier medium plus cycloaliphatic diol contains from 60% water/40% solvent/cycloaliphatic diol mixture to 95% water/5% solvent/cycloaliphatic diol mixture.

29. The pigmented ink composition of claim 28 wherein the solvent/cycloaliphatic diol mixture contains 15–95% cycloaliphatic diol.

30. The pigmented ink composition of claim 29 wherein the solvent/cycloaliphatic diol mixture contains 25–75% cycloaliphatic diol.

31. The pigmented ink composition of claim 26 wherein said ink contains approximately 0.1 to 8% pigment, 0.1 to 8% block copolymer, and 94 to 99.8% aqueous carrier medium plus cycloaliphatic diol.

32. The pigmented ink composition of claims 19 or 26 wherein the A segment of said block copolymer is a polymer of methyl methacrylate, butyl methacrylate, or 2-ethylhexyl methacrylate and the B segment is a polymer of methacrylic acid or dimethylaminoethyl methacrylate.

33. The pigmented ink composition of claims 19 or 26 wherein the B segment(s) constitute approximately 25 to 65%, by weight, of said block copolymer.

34. The ink composition of claim 1 wherein said ink contains up to 20% dye, and 70 to 99.8% aqueous carrier medium plus cycloaliphatic diol.

35. The ink composition of claim 34 wherein said aqueous carrier medium plus cycloaliphatic diol contains 35% cycloaliphatic diol.

36. The ink composition of claims 1 or 3 wherein the aqueous carrier medium is a mixture of water and at least one water soluble organic solvent having at least 2 hydroxyl groups.

37. The pigmented ink composition of claim 3 wherein the pigment particles have a median particle size of approximately 0.01 to 1 micron.

38. The pigmented ink composition of claim 19 wherein the neutralizing agent for the B segment is selected from the group consisting of organic bases, alkanolamines, alkali metal hydroxides, and mixtures thereof.

39. The ink composition of claims 1 or 3 wherein a surfactant is present.

40. The ink composition of claim 39 wherein the surfactant is a polyalkyleneoxide modified polydimethylsiloxane.

* * * * *